Sept. 22, 1942.        M. McMAHON        2,296,648
AUTOMATIC SHUT-OFF VALVE FOR HIGH AND LOW PRESSURE
AND TEMPERATURE RELEASE
Filed March 3, 1941
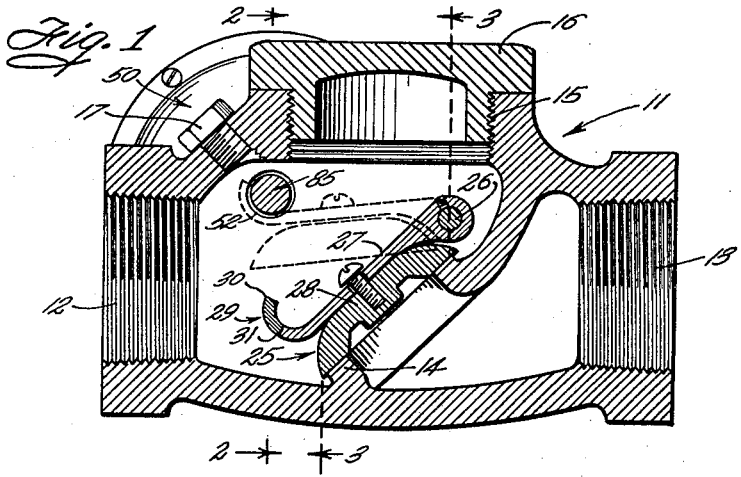
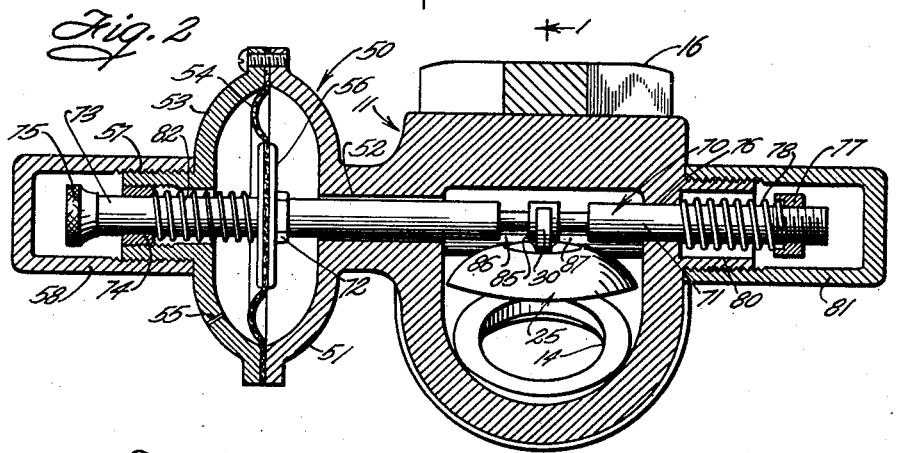
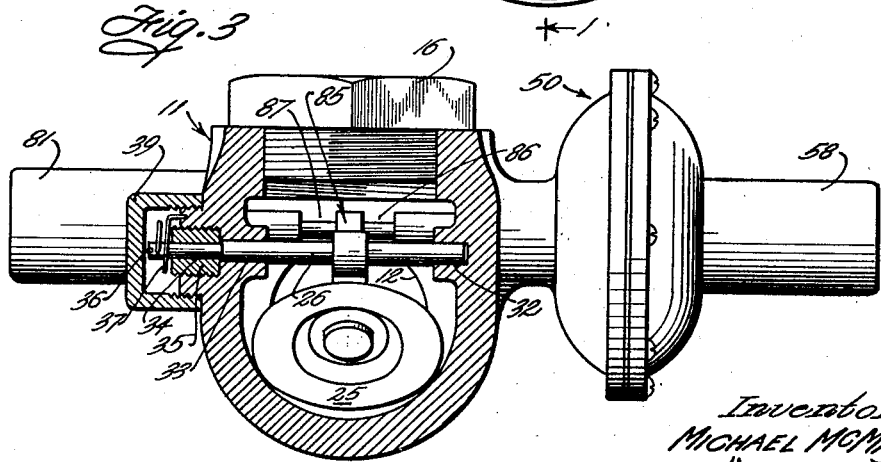
Inventor
MICHAEL McMAHON
By Hazard and Miller
Attorneys Patented Sept. 22, 1942

2,296,648

UNITED STATES PATENT OFFICE 2,296,648

AUTOMATIC SHUTOFF VALVE FOR HIGH AND LOW PRESSURE AND TEMPERATURE RELEASE

Michael McMahon, South Gate, Calif.

Application March 3, 1941, Serial No. 381,484

6 Claims. (Cl. 137—153)

My invention pertains mainly to gas shut off valves of an automatic type and intended especially for installation in gas lines connecting to consumer services such as households or industrial plants utilizing gas for fuel or other purposes.

It is highly desirable to have a valve in such supply lines which will automatically shut off and maintain the service connection closed should the gas pressure drop below the normal or increase above the normal pressure. In the servicing of gas supply as instanced for domestic services, it sometimes happens that the pressure decreases below the normal, for instance, the district regulator may fail, the supply line become broken due to earth shock, floods, etc. or occasionally the workman closes the wrong valve on distribution lines and also when repairs are made it is necessary to shut off the supply line. Before turning on or establishing the gas service through the mains it is necessary for a workman to visit each residence or place being supplied with gas and manually shut off such gas to avoid the danger of fire or explosions due to the free passage of the gas through automatic heaters, boilers, pilots on appliances and the like which may have been extinguished due to the failure of the gas pressure. It is then necessary after the pressure has been established to go back over the service to open the gas supply and light the pilots and the burners for other supplies. In addition sometimes the gas pressure in the main builds up much above the normal causing such a pressure as to blow out the gas at burners and also pilots thus causing an escape of a large amount of gas in a short time. In such cases there should be a valve on the individual supply line to shut off automatically on this high pressure and then when the pressure is reduced to normal, the valve may be opened and the burners and pilots of the service ignited.

There is also the danger from the ordinary gas service should the building catch fire or there be a dangerous fire in proximity to the supply line to the particular service of the gas becoming ignited. It is therefore highly desirable to have an automatic valve which will shut off on being overheated.

My invention comprehends a valve for gas supply lines in particular design, for individual services, to automatically close on the changes of gas pressure below or above the normal and also to close on overheating the valve due to proximity to a fire. A further feature of my invention is the construction of the valve to be readily re-set to the open valve position by a workman by the gas being again delivered at the normal operating pressure. My invention also sets forth a construction of valve elements which may readily be replaced through the fusing of an element due to abnormally high temperature.

Considered more specifically, my invention includes a gas valve of a type having a pivoted flap or plug to close on the seat. The hinge support for the plug is provided with a hook at the free end which is normally engaged by a cylindrical retaining surface on a slidable rod, this being positioned transversely of the valve housing. The rod is operated by a diaphragm subject to gas pressure of the valve housing on one side, the diaphragm being suitably controlled by a spring. As the bearing surface on the rod is of larger diameter than the rod, when the pressure decreases below normal the diaphragm moves in one direction shifting the rod and thereby releasing the hook of the flap allowing the automatic closing of the valve. Should the pressure increase above normal the diaphragm is moved in an opposite direction, it again moving the rod with a reverse movement against the action of an adjusting spring, this causing a releasing of the hook for valve closure. Another feature of my invention is forming a hook or a portion adjacent thereto with fusible metal which releases at a designated temperature, thus allowing the valve to close when the temperature is abnormally high such as caused by a fire.

An important feature of my invention is the total disassociation of the valve plug and the latch when the valve has been released on decrease or increase of gas pressure from the normal. Hence, even if a pressure is built up to operate the diaphragm, it cannot again latch the valve plug in its open valve position but this remains closed irrespective of any gas leaks or the like. The valve may only be brought into its open valve position by a manual operation involving lifting of the valve plug and engaging the hook of such plug with the diaphragm operated latch.

My invention is illustrated in connection with the accompanying drawing in which:

Fig. 1 is a longitudinal section on the line 1—1 of Fig. 2 in the direction of the arrow showing the valve in the closed position.

Fig. 2 is a transverse section on the line 2—2 of Fig. 1 in the direction of the arrows illustrating the diaphragm and the control rod.

Fig. 3 is an irregular section on the section line 3—3 of Fig. 1 in the direction of the arrows illustrating the re-setting valve pivot for the valve plug or flap.

In my invention I employ a valve having a valve housing 11 part of which is conventional being provided with a threaded inlet end 12 and an outlet end 13. The valve seat 14 is inclined. A threaded opening 15 above the seat has a plug 16 screw threaded therein, the opening being of sufficient size to permit entrance of the valve plug and to make adjustments as desired. There is also an opening with a plug 17 in line with the center of the valve seat to insert a tool for grinding such seat.

The valve flap or plug assembly 25 employs a pintle shaft 26, an arm 27 secured thereto by a set screw or the like. This arm has a perforation and a disk plug or flap 28 is secured somewhat loosely by a set screw or the like, this allowing the plug to turn and accommodate itself to the seat. The end of the arm is provided with an upturned hook 29. This is made with an outer end portion 30 connected to the main portion of the arm by fuse metal indicated at 31 or if desired the whole end 30 of the arm may be of fuse metal. The pintle 26 has a bearing 32 in one side of the housing and passes through a second bearing 33 in the opposite wall of the housing. The outer end 34 of the pintle is reduced and retained in adjusted position by a nut 35 threaded into a recess in the housing. A screw driver kerf 36 or a wrench grip is formed on the outer extremity of the pintle. A coil spring 37 has one end caught to the pintle and the other end in part of the housing, this spring being tensioned to urge the valve flap from an open to a closed valve position. The spring may be made sufficiently strong so that gravity is not necessary to cause a valve closure when the arm is released as hereunder described. A gas retaining cap 39 is screw threaded on the housing and encloses the end of the valve pintle. After the valve is automatically closed and it is desired to reseat this in the open position, a workman may remove the cap 39 and then by means of a screw driver or a wrench engage the end of the pintle rotating this until the valve arm and flap is raised permitting the hook of the arm to grip the release rod retaining surface hereunder described.

The diaphragm assembly 50 includes a half housing 51 which is formed integral with the main valve housing, there being a communicating passage 52 for equalizing the gas pressure in the diaphragm housing and in the main part of the valve. A complementary cap 53 with a flexible diaphragm 54 therebetween completes the housing for the diaphragm, there being a small bleeder air duct 55 through the cap. The diaphragm is illustrated as being of a conventional type with clamping plates 56 on opposite sides. The cap is provided with an extension neck 57 threaded both on the inside and outside and the gas confining cap 58 is threaded on the outside.

The release rod assembly designated 70 includes a sliding rod 71 which is secured to the diaphragm by nuts 72 or the equivalent. An outward extension 73 of the rod passes through a guide nut 74 threaded into the neck 57. A buttonlike head 75 is secured to the outer end of this extension for manual manipulation of the rod. This rod passes through the opening or passage 52 connecting the main valve housing and the diaphragm housing. It extends transversely across the valve chamber on the inlet side, passes through a bearing 76 on the opposite side. A nut 77 is threaded on the end of the rod and coil spring 78 bears against the housing adjacent the bearing 76 and the nut. This spring is resistant to excess pressure of gas up to a known value to control the action on high pressure. This may be designated as the high pressure spring. In order to form a gas tight covering for the adjusting nut 77, a hollow stud 80 forms part of the housing positioned around the bearing 76 and a gas leak preventative cap 81 is threaded thereon. There is also a spring 82 between the diaphragm and the nut 74. This is a weaker spring than the spring 78 and is intended to shift the rod lengthwise when the pressure decreases below the normal.

The valve latch 85 is a cylinder or a cylindrical section formed on the rod with reduced necks 86 and 87 adjacent thereto. For sake of convenience the whole rod except the necks is shown of the same diameter as the cylinder 85. The cylinder is also comparatively narrow but is shown as being wider than the hook end of the arm 27. To latch the valve in the open valve position it is necessary to manually shift the rod one way or another, this being usually done when there is no gas pressure until the latching cylinder is out of alignment with the hook 29. The hook 29 then aligns with either neck 86 or 87. The pintle 26 is then rotated as by engaging the screw driver kerf 36 until the valve arm is raised with the hook aligning with the latching cylinder 85. The rod is then shifted lengthwise until the hook catches the cylinder 85, the hook end portion being sufficient to hold the valve arm and flap in the open valve position as shown by the dotted lines in Fig. 1. It is necessary that the reduced neck portions of the rod adjacent the latch cylinder be of such length and diameter that when the hook releases the hook end will not catch on the neck portion of the rod but will leave a clear space for the end of the hook so that the valve flap may swing from its open to its closed position.

By my construction therefore when the valve is released through the operation of the diaphragm either by a decrease of pressure or increase above the normal or by fusing of the end 30, any action on the diaphragm cannot open or cause passage of gas through the valve. The valve plug can only be re-set to an open valve position by manual operation. By the construction above described therefore when the valve is in its closed or shut off position the closure element such as the plug or flap is entirely disassociated from the diaphragm, in fact, when the plug is in its open or latched position affording an open valve, such plug may only be released by the operation of the diaphragm due to decrease or increase of pressure or by manually shifting the rod 70 with its release latch or by fusing and thus breaking the end 29 of the hook on the valve plug. This entire disassociation of the valve plug and the latching device associated therewith means that even should the gas pressure be restored with any pressure normal, below or above normal pressure, the action of the diaphragm and the movement of the rod 70 cannot in any manner open the valve even slightly. It is necessary to employ a manual operation to lift the valve plug from its seat, hold this in the desired position and to center the valve latch 85 with the hook.

In the description while I have shown the valve as closed by a pivoted plug and the control being by a diaphragm, it is to be understood that the same principles would apply to other types of valve closures and to other gas pressure reactive devices than those of the diaphragm type.

Various changes may be made in the details of the construction without departing from the spirit or scope of the invention as defined by the appended claims.

I claim:

1. A valve having a housing, a seat in the housing, a valve adapted to seat thereon, a rod axially movable in the housing having a protuberance thereon, means for moving said rod in accordance with pressures within the housing, and means on the valve engageable with the protuberance for holding the valve open until the pressure in the housing abnormally increases or decreases in which event said protuberance will disengage said means and allow said valve to close.

2. A valve having a housing, a seat in the housing, a valve adapted to seat thereon, a rod movable in the housing having a portuberance thereon, means for moving said rod in accordance with pressures within the housing, and means on the valve engageable with the protuberance for holding the valve open until the pressure in the housing abnormally increases or decreases in which event said protuberance will disengage said means and allow said valve to close, said means on the valve that engages the protuberance being formed of readily fusible material adapted to release the valve in the event of excessive temperatures independently of any abnormal increase or decrease of pressure.

3. A valve having a housing, a seat in the housing, a valve adapted to seat thereon, and means for holding said valve open including a hook on the valve, a rod having a protuberance engageable by the hook, and diaphragm means for moving the rod axially in accordance with pressures in the housing whereby, in the event of either abnormal increase or decrease of pressures within the housing, the protuberance will be caused to release the hook and allow the valve to close.

4. A valve having a housing, a seat in the housing, a valve adapted to seat thereon, and means for holding said valve open including a hook on the valve, a rod having a protuberance engageable by the hook, and diaphragm means for moving the rod in accordance with pressures in the housing, whereby, in the event of either abnormal increase or decrease of pressures within the housing, the protuberance will be caused to release the hook and allow the valve to close, said hook being formed of readily fusible material whereby, in the event of excessive temperatures within the housing, the valve may be released independently of pressure conditions.

5. A valve having a housing, a seat arranged transversely within the housing, a pivoted valve within the housing adapted to seat thereon, a rod arranged transversely of the housing having an enlargement on both sides of which are reduced necks, spring means for holding said rod in normal position, diaphragm means for moving said rod in accordance with pressure conditions within the housing, and means connecting said valve with the enlargement to hold said valve open until abnormally high or low pressure conditions exist within the housing to shift the enlargement from within the hook and effect a release of the valve.

6. A valve having a housing, a seat arranged transversely within the housing, a pivoted valve within the housing adapted to seat thereon, a rod arranged transversely of the housing having an enlargement on both sides of which are reduced necks, spring means for holding said rod in a normal position, diaphragm means for moving said rod in accordance with pressure conditions within the housing, and means connecting said valve with the enlargement to hold said valve open until abnormally high or low pressure conditions exist within the housing to shift the enlargement from within the hook and effect a release of the valve, said last mentioned means being formed of readily fusible material.

MICHAEL McMAHON,